US006989612B2

(12) United States Patent
Cividino et al.

(10) Patent No.: US 6,989,612 B2
(45) Date of Patent: *Jan. 24, 2006

(54) DYNAMIC CONTROL OF POWER CONVERTER OUTPUT VOLTAGE SLEW RATE

(75) Inventors: Lorenzo Anthony Cividino, Franklin, MA (US); Dayu Qu, Malden, MA (US)

(73) Assignee: Power-One, Inc., Camarillo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/174,811

(22) Filed: Jul. 1, 2005

(65) Prior Publication Data

US 2005/0242668 A1  Nov. 3, 2005

Related U.S. Application Data

(63) Continuation of application No. 10/670,050, filed on Sep. 24, 2003, now Pat. No. 6,914,348.

(51) Int. Cl.
*H02J 1/10* (2006.01)

(52) U.S. Cl. ......................................... 307/58; 307/82
(58) Field of Classification Search ................ 323/267; 307/58, 82; 327/134, 170
See application file for complete search history.

(56) References Cited

U.S. PATENT DOCUMENTS 6,914,348 B2 * 7/2005 Cividino et al. .............. 307/58

* cited by examiner

Primary Examiner—Adolf Berhane

(74) Attorney, Agent, or Firm—O'Melveny & Myers LLP

(57) ABSTRACT

A system and method is provided for dynamically controlling output voltage slew rate in a power converter. Preferred embodiments of the present invention operate in accordance with a power converter including at least a slew-rate control lead (a trim lead, a control lead, etc.), an error-amplifier circuit located therein, a slew-rate circuit, and a controller electrically connected to the power converter and adapted to dynamically control the converter's output voltage slew rate through the transmission of a slew-rate signal. In one embodiment of the present invention, the slew-rate circuit is external to the power converter and electrically connected to both a trim lead of the power converter and to the controller. In another embodiment of the present invention, the slew-rate circuit is internal to the power converter and electrically connected to both a control lead of the power converter and to the error-amplifier circuit. In either embodiment, the controller is adapted to transmit a slew-rate signal to the slew-rate-control lead (i.e., the trim lead, the control lead, etc.), where the nature of the slew-rate signal is dependant on the configuration of the slew-rate circuit. For example, if the slew-rate circuit comprises a transistor and/or a capacitor, the slew rate signal may comprise a dynamically adjusted voltage or charge-based signal; if the slew-rate circuit comprises a resistor, the slew-rate signal may comprise a dynamically adjusted current-based signal; or if the slew-rate circuit comprises a digital variable resistor, the slew-rate signal may comprise a dynamically adjusted digital signal.

18 Claims, 4 Drawing Sheets

FIG. 8
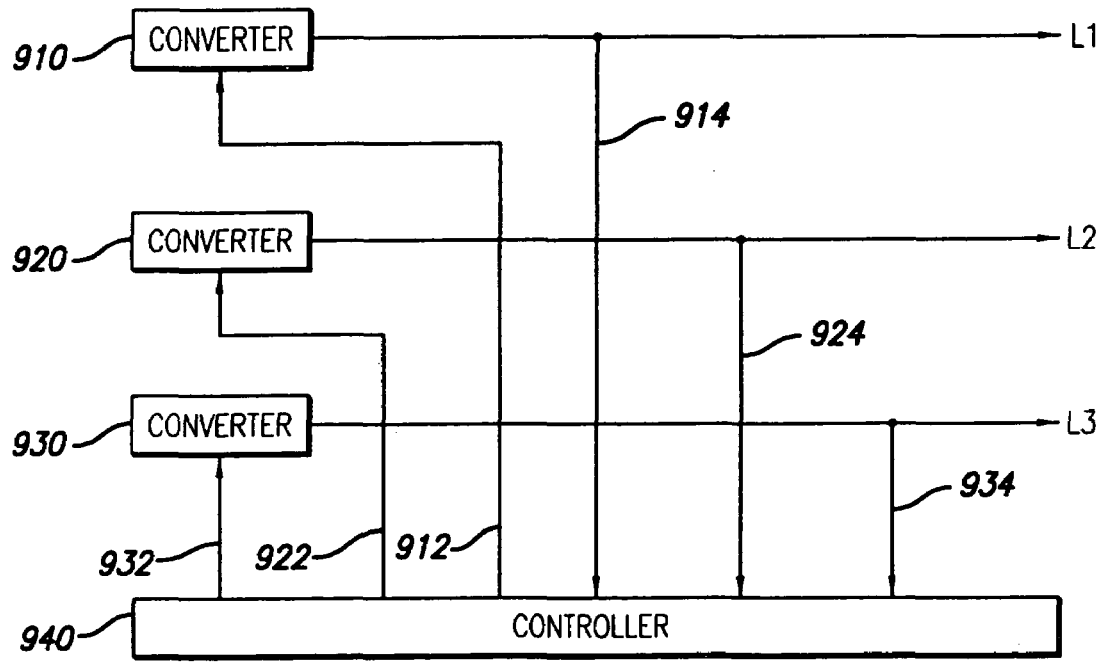
FIG. 9

DYNAMIC CONTROL OF POWER CONVERTER OUTPUT VOLTAGE SLEW RATE

RELATED APPLICATION DATA

This patent application is a continuation of U.S. patent application Ser. No. 10/670,050, for DYNAMIC CONTROL OF POWER CONVERTER OUTPUT VOLTAGE SLEW RATE, filed Sep. 24, 2003, issued as U.S. Pat. No. 6,914,348 on Jul. 5, 2005.

BACKGROUND OF THE INVENTION

1. Field of the Invention

The present invention relates to power converters, or more particularly, to a system and method of dynamically controlling a power converter's output voltage slew rate, or rate of rise and/or decay.

2. Description of Related Art

Electronic circuits typically include a plurality of electronic loads, in which each load is required to be driven (or powered) in a particular sequence and by a voltage having a particular slew rate. The traditional method of accomplishing this is through the use of a plurality of power converters (e.g., voltage regulators, DC/DC converters, etc.) an external controller, and external circuitry (e.g., external transistor switches, etc.). Specifically, the power converters are adapted to convert a single input voltage into a plurality of output voltages, where each output voltage corresponds to a particular load. Each voltage is then provided to a corresponding load via an external transistor switch. This enables the external controller, via its connection to each transistor switch, to control when and how each output is provided. In other words, by activating and modulating the transistor switches, the controller manages the order in which the voltages are provided and their slew rates.

While most power converters have an internal mechanism (e.g., an internal error-amplifier circuit) for marginally adjusting the power converter's output voltage, these mechanisms are traditionally hardwired and are unrelated to slew rate. Specifically, internal error-amplifier circuits typically include a plurality of input leads, including a positive sense lead (e.g., to receive+$V_{out}$), a negative sense lead (e.g., to receive–$V_{out}$), and a trim lead (e.g., to receive $V_{ref}$). The trim lead is typically hardwired (e.g., using a resistor, etc.) to either the positive or negative sense lead, depending on whether the output voltage is to be maintained below or above a particular voltage level. The voltage at the trim lead (i.e., the reference voltage) is then used by the error-amplifier circuit to adjust (or trim) the output voltage. Thus, the traditional method of dynamically controlling a power converter's output voltage slew rate is through the use of an external transistor switch, as previously discussed.

The drawbacks of this method, however, is that it adds complexity, expense and size to the power system by requiring a plurality of external components (e.g., external transistor switches, etc.) and a plurality of traces connecting these components to the external controller. Thus, it would be advantageous to have a system and method of dynamically controlling output voltage slew rate that overcomes at least one of these drawbacks.

SUMMARY OF THE INVENTION

The present invention provides a system and method of dynamically controlling output voltage slew rate in a power converter. Embodiments of the present invention operate in accordance with a power converter having at least a slew-rate-control lead (e.g., trim lead, control lead, etc.), an error-amplifier circuit located therein, a slew-rate circuit, and a controller electrically connected to the power converter and adapted to dynamically control output voltage slew rate through the transmission of a slew-rate signal (e.g., a voltage-based signal, a charge-based signal, a current-based signal, etc.).

In one embodiment of the present invention, a slew-rate circuit is located external to a power converter. Specifically, the slew-rate circuit comprises an external transistor that is electrically connected to both a controller and a trim lead of the power converter, wherein the trim lead is connected to an internal error-amplifier circuit. More particularly, the internal error-amplifier circuits is adapted to adjust the output voltage in response to a voltage differential between a reference voltage (as provide by the trim lead) and a sensed output voltage. By varying the voltage drop across the transistor (i.e., varying the reference voltage), the error-amplifier circuit can be used to ramp the output voltage up at a particular rate, or achieve a particular slew rate. Thus, by varying the voltage drop across the transistor, the controller can dynamically control the converter's output voltage slew rate.

In another embodiment of the present invention, a slew-rate circuit is located within a power converter. Specifically, the slew-rate circuit comprises a transistor that is electrically connected to both an error-amplifier circuit and a control pin of the power converter. In this embodiment, the controller dynamically adjusts output voltage slew rate by transmitting a series of voltages or charges to the transistor. This embodiment is advantageous in that the error-amplifier circuit can be used to perform multiple functions—e.g., trim the output voltage and control output voltage slew rate. This is because the power converter (in this embodiment) includes both a trim lead and a control lead. Thus, for example, the error-amplifier circuit can be used to (i) marginally adjust the output voltage in response to a reference voltage (i.e., as received via the trim lead) and (ii) control output voltage slew rate in response to a slew-rate signal (i.e., as received via the control lead).

In another embodiment of the present invention, the slew-rate circuit comprises a resistor and the transmitted slew-rate signal comprises a series of currents (i.e., a current-based slew-rate signal). In yet another embodiment of the present invention, the slew-rate circuit comprises a digital variable resistor (i.e., an impedance-based circuit) and the transmitted slew-rate signal comprises a series of digital signals (e.g., for controlling the impedance level of the variable resistor).

A more complete understanding of the system and method of dynamically controlling output voltage slew rate will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 8 (in conjunction with FIG. 7) illustrates a current-based system for dynamically controlling output voltage slew rate in accordance with one embodiment of the present invention.

FIG. 9 illustrates a system for controlling and monitoring a plurality of power converters in accordance with one embodiment of the present invention.

DETAILED DESCRIPTION OF THE PREFERRED EMBODIMENT

The present invention provides a system and method of dynamically controlling output voltage slew rate in a power converter. In the detailed description that follows, like element numerals are used to describe like elements illustrated in one or more figures.

Figure 1:
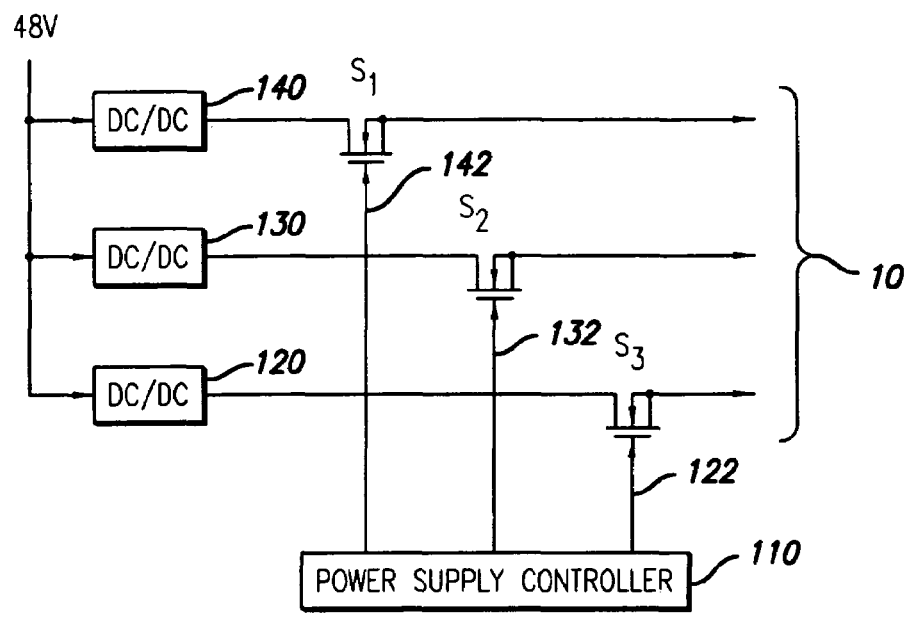
FIG. 1 illustrates a prior art system for controlling a plurality of power converters.

FIG. 1 illustrates a prior art system 10 for controlling a plurality of power converter outputs. Specifically, a plurality of external transistor switches (i.e., S1, S2 and S3) are electrically connected to a plurality of power converters (i.e., 120, 130 and 140), a plurality of loads (not shown), and a power supply controller 110. In operation, power converter 140 is adapted to converter an input voltage (e.g., 48V, etc.) into a desired output voltage $V_A$. The desired output voltage is then provided to a corresponding transistor switch S1, where it is controlled by the controller 110. Specfically, the controller 110, through its connection to the transistor switch (i.e., 142), determines when the output is provided to the load (not shown) and the output voltage's slew rate. Thus, by activating and modulating the transistor switch S1, the output can be properly timed and its slew rate can be properly controlled. The remaining power converters (i.e., 120 and 130) operate in a similar manner.

Figure 2:
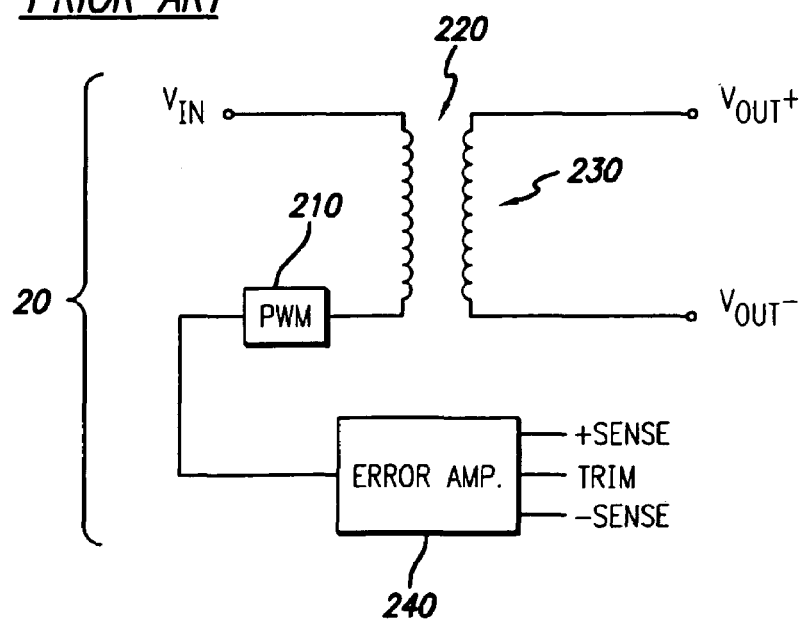
FIG. 2 illustrates a prior art mechanism (i.e., error-amplifier circuit) for marginally adjusting a power converter's output voltage.

While most power converters have an internal mechanism (e.g., an internal error-amplifier circuit) for marginally adjusting the power converter's output voltage, these mechanisms are traditionally hardwired and are unrelated to varying (or controlling) slew rate. For example, FIG. 2 illustrates an exemplary portion of a power converter 20, including a primary winding 220, a secondary winding 230, a pulse width modulator (PWM) 210 and an error-amplifier circuit 240. The PWM 210 operates to draw current through the primary winding 220 at a particular rate, which results in a transfer of power to the secondary winding 230, thereby defining an output voltage $V_{out}$ across the secondary winding. The error-amplifier circuit 240 receives (or senses) the output voltage and uses a reference voltage to provide a voltage error ($V_{err}$) signal to the PWM 210. In response to the $V_{err}$ signal, the PWM 210 adjusts the output voltage by adjusting the rate at which current is being drawn through the primary winding 220.

Figure 3:
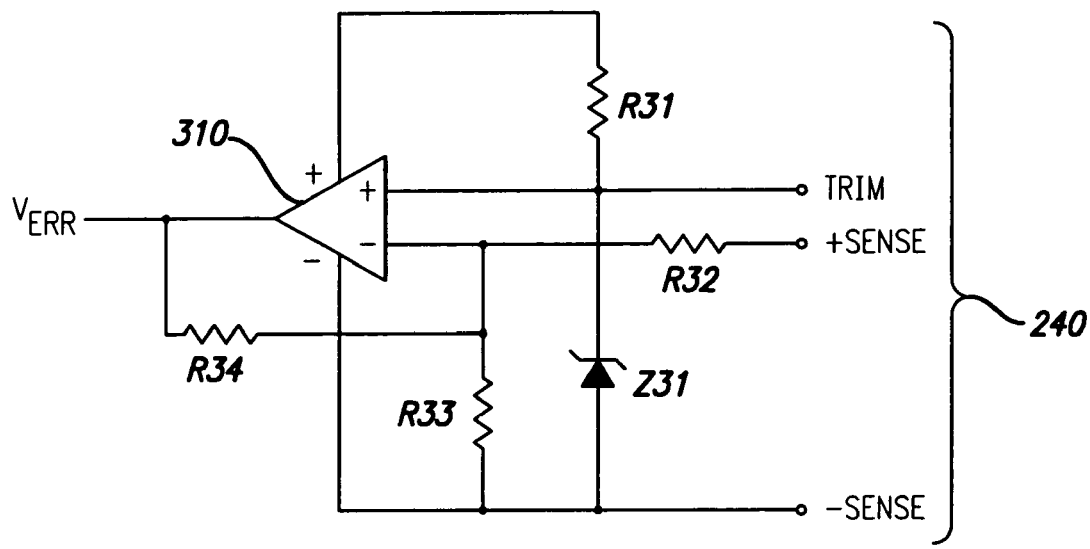
FIG. 3 further illustrates the error-amplifier circuit depicted in FIG. 2.

Specifically, as shown in FIG. 3, the error-amplifier circuit 240 typically includes a plurality of inputs, including a positive sense lead, a negative sense lead, and a trim lead, and a plurality of components, including an operational amplifier 310 (op-amp), a plurality of resistors (e.g., R31, R32, R33 and R34) and a zener diode Z31 (or suitable reference voltage). In operation, the sensed output voltages (both negative and positive) are coupled to the negative and positive sense leads, respectively. Resistors R32, R33 and R34 define the gain characteristics of the error-amplifier circuit 240. The trim lead is typically hardwired using a resistor (not shown) to either the positive or negative sense lead, depending on whether the output voltage is to be maintained below or above a particular voltage level. Zenor diode Z31 defines a reference voltage on the non-inverting input of op-amp 310. The op-amp 310 produces a voltage error ($V_{err}$) signal that is provided to the PWM 210 (see FIG. 2) and used to adjust the output via the current drawn through the primary winding.

The error-amplifier circuit, as traditionally used, does not control and/or adjust the output voltage slew rate. In fact, the traditional method of dynamically controlling a power converter's output voltage slew rate is through an external transistor switch, as shown in FIG. 1. The drawback with such a method, however, is that it adds complexity, expense and size to the overall electronic device (not shown) by requiring a plurality of external transistor switches and a plurality of traces connecting the switches to the external controller.

Figure 4:
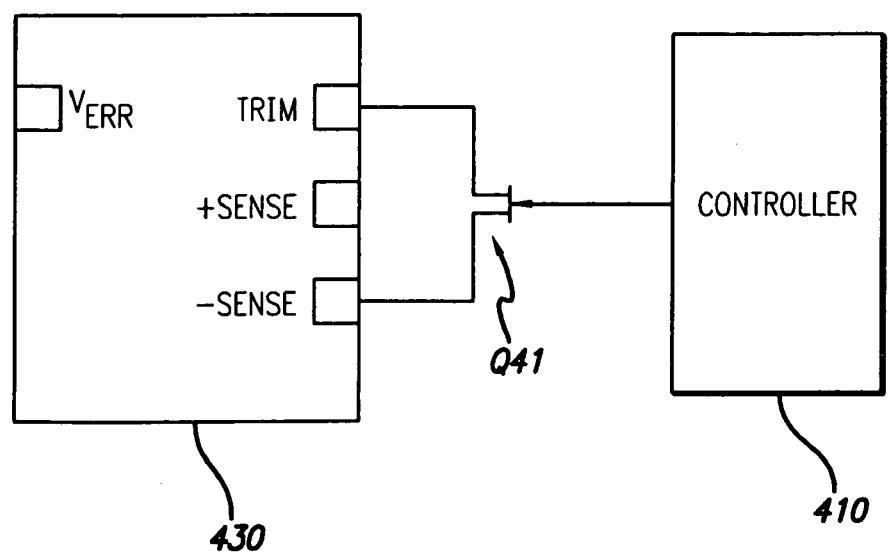
FIG. 4 illustrates a charge or voltage-based system for dynamically controlling output voltage slew rate in accordance with one embodiment of the present invention.

FIG. 4 illustrates a charge or voltage based system for dynamically controlling output voltage slew rate in accordance with one embodiment of the present invention. Specifically, a controller 410 is electrically connected to an error-amplifier circuit 430, or more particular to its trim lead, via a transistor Q41 (i.e., an external slew-rate circuit). By varying the voltage (or electrical charge) provided to the gate terminal of transistor Q41, and thus varying the voltage placed on the trim lead, the output voltage's slew rate can be adjusted. For example, referring to FIGS. 3 and 4, when the transistor Q41 is turned off, the trim lead is essentially floating (due to the open circuit), and its voltage (i.e., the reference voltage) is established by the zenor diode Z31. Thus, when the trim lead is floating, the error-amplifier circuit (e.g., 240, 430, etc.) will only affect the output voltage if its voltage level differs from what it is supposed to be. In other words, the power converter uses the error-amplifier circuit to produce (or maintain) its pre-determined output voltage (e.g., 3V, 5V, etc.).

Alternately, when the transistor Q41 is turned full on, the trim lead and the negative sense lead are shorted together. Thus, the error-amplifier circuit acts as if the output voltage is too high, and effectively reduces the output voltage (e.g., via the PWM) down (e.g., to zero volts). From this it can be seen that by turning the transistor full on and gradually turning it off, the controller can ramp the output voltage at a desired rate (i.e., to produce a desired slew rate). It should be appreciated that the transistors depicted herein (e.g., Q41, Q51, etc.) include, but are not limited to, junction field effect transistors (JFETs), bi-polar transistors, and all other transistors generally known to those skilled in the art. It should further be appreciated that the controllers depicted herein (e.g., 410) include, but are not limited to, application specific integrated circuits (ASICs), processors, microprocessors, and all other computing devices generally known to those skilled in the art. It should also be appreciated that error-amplifier circuits vary in their designs and/or components, and that the present invention is not limited to any particular type of error-amplifier circuit. Thus, the use of any correction-control circuitry is considered within the spirit and scope of the present invention.

Figure 5:
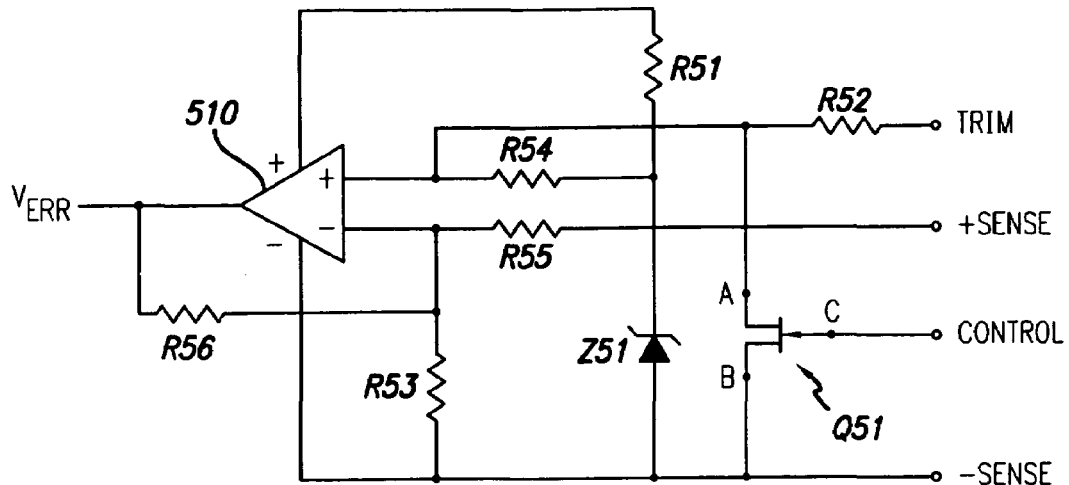
FIG. 5 illustrates a charge or voltage-based system for dynamically controlling output voltage slew rate in accordance with another embodiment of the present invention.

The present invention is also not limited to the location of the slew-rate circuit. For example, FIG. 5 illustrates a charge or voltage based system for dynamically controlling output voltage slew rate, in which the transistor is part of the error-amplifier circuit (or internal to the power converter). Specifically, the transistor Q51 is electrically connected to the error-amplifier circuit (as previously discussed) and to a control lead of the power converter. The transistor is modulated (e.g., by a controller) through this control lead to produce an output voltage having a particular slew rate. In this embodiment, the power converter (not shown) includes both a control lead (e.g., for controlling slew rate) and a trim lead (e.g., for providing an error-amplifier reference voltage). In order to perform both functions, additional resistors (e.g., R52 and R54) are added. It should be appreciated that the location of the slew-rate circuit (e.g., transistor) within the error-amplifier circuit is not intended to limit the present invention. Thus, for example, electrically connecting the slew-rate circuit to the positive sense lead (as oppose to the negative sense lead) is considered within the spirit and scope of the present invention.

Figure 6:
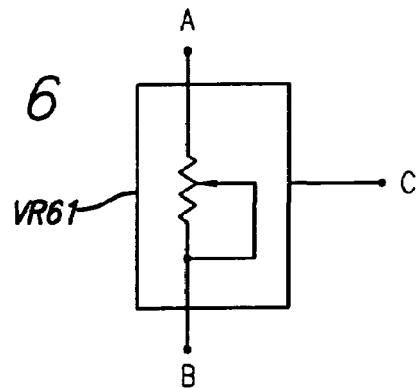
FIG. 6 (in conjunction with FIG. 5) illustrates an impedance-based system for dynamically controlling output voltage slew rate in accordance with one embodiment of the present invention.

In another embodiment of the present invention, the slew rate is dynamically controlled by adjusting a variable resistor. For example, as illustrated in FIGS. 5 and 6, the transistor G51 (see FIG. 5) is replaced by a digital variable resistor VR61 (see FIG. 6). Specifically, the variable resistor is connected between the negative sense lead (node B) and the non-inverting input of the op-amp 510 (node A), and controlled via the control lead (node C). By digitally adjusting the variable resistor (e.g., between a lower resistive value and a higher resistive value) the output voltage slew rate can be dynamically controlled.

Figure 7:
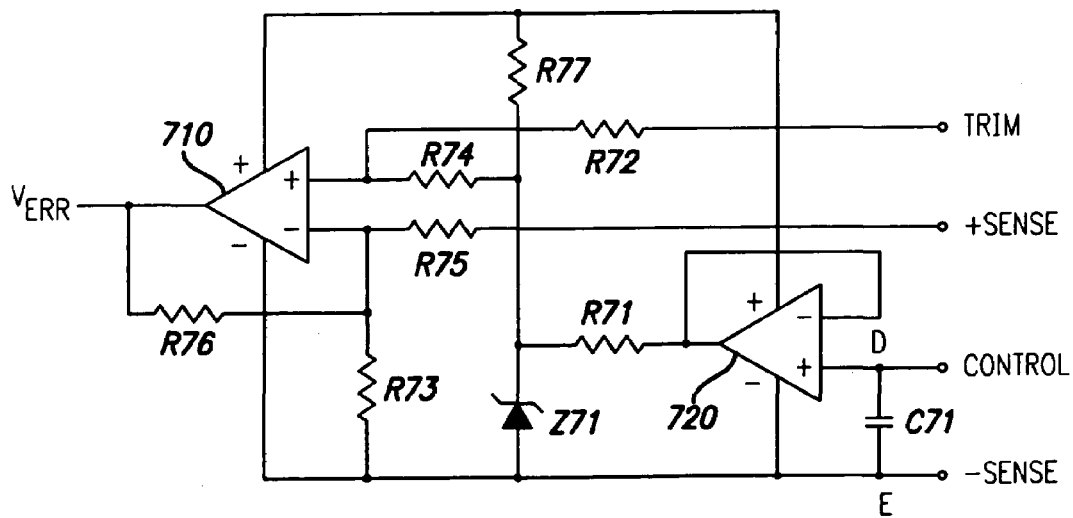
FIG. 7 illustrates a charge or voltage-based system for dynamically controlling output voltage slew rate in accordance with another embedment of the present invention.

FIG. 7 illustrates a voltage or charge based system for dynamically controlling output voltage slew rate in accordance with another embodiment of the present invention. In this embodiment, a voltage (or charge) is place across capacitor C71 and provided to a non-inverting input of a first op-amp 720. The resulting voltage (which cannot be more than the voltage drop across zenor diode Z71) is provided to the non-inverting input of a second op-amp 710 (i.e., as a reference voltage). The voltage differential between the reference voltage and the voltage provided to the negative input (e.g., the output-indicative voltage), which is derived from the positive sense lead, controls the amount (if at all) in which the output voltage is adjusted. Thus, the slew rate can be dynamically controlled by placing a relatively low voltage across the capacitor C71 and increasing it until the desired voltage drop across the zenor diode Z71 is achieved.

In another embodiment of the present invention, the slew rate is controlled by dynamically adjusting a current. For example, by replacing the capacitor C71 with a resistor R81 (see FIG. 8), the output voltage slew rate can be adjusted by dynamically controlling the current flowing therethrough. In other words, the slew-rate can be adjusted as previously discussed by dynamically adjusting the current flowing through resistor R81 (as opposed to dynamically adjusting the voltage or charge placed across the capacitor C71).

FIG. 9 illustrates a system for controlling and monitoring a plurality of power converters. Specifically, a controller 940 is electrically connected to a plurality of power converters (i.e., 910, 920 and 930) via a plurality of input connections (i.e., 912, 922 and 932) and a plurality of output connections (i.e., 914, 924 and 934). In this embodiment of the present invention, each input connection is connected to a slew-rate-control lead (e.g., trim lead, control lead, etc.) of a corresponding power converter (either via an external slew-rate circuit (not shown) or directly). It is through this connection that the slew rate is adjusted (e.g., by dynamically adjusting voltage, charge, current or impedance). The output voltage of the power converters can then be monitored (e.g., by the controller 940) through their respective output connections.

Having thus described a preferred embodiment of a system and method of dynamically controlling output voltage slew rate, it should be apparent to those skilled in the art that certain advantages of the system have been achieved. It should also be appreciated that various modifications, adaptations, and alternative embodiments thereof may be made within the scope and spirit of the present invention. For example, the present invention can be used in conjunction with a number of differently designed error-amplifier (or correction-control) circuits, including standard and customized circuit. The invention is further defined by the following claims.

What is claimed is:

1. A method of controlling output voltage slew rate in a power converter, comprising:
    electrically connecting a controller to at least one power converter having a plurality of pins, said plurality of pins including a slew-rate-control pin;
    transmitting a slew-rate signal to said slew-rate-control pin; and
    adjusting the output voltage slew rate of said at least one power converter in response to said slew-rate signal.

2. The method of claim 1, wherein said plurality of pins further comprises a trim pin and said step of transmitting a slew-rate signal further comprises transmitting a slew-rate signal to an external transistor electrically connected to said trim pin.

3. The method of claim 1, wherein said plurality of pins further comprises:
    a trim pin; and
    a control pin electrically connected to said trim pin via an internal error-amplifier circuit, said slew-rate signal being transmitted to said control pin.

4. The method of claim 3, wherein said step of transmitting a slew-rate signal further comprises transmitting a series of voltages to said control pin.

5. The method of claim 3, wherein said step of transmitting a slew-rate signal further comprises transmitting a series of currents to said control pin.

6. The method of claim 3, wherein said step of transmitting a slew-rate signal further comprises transmitting a series of charges to said control pin.

7. The method of claim 3, wherein said step of transmitting a slew-rate signal further comprises transmitting digital signals to a digital potentiometer via said control pin.

8. The method of claim 1, further comprising the step of monitoring the slew rate of an output voltage of said at least one power converter by receiving said output voltage via an output pin.

9. The method of claim 1, wherein said step of adjusting the output voltage slew rate further comprises adjusting said output voltage slew rate in response to a magnitude of said slew-rate signal and a rate at which said slew-rate signal is being adjusted.

10. A system for controlling output voltage slew rate of a power converter, comprising;
    a controller; and
    a power converter electrically connected to said controller, said power converter comprising:

an error-amplifier circuit adapted to adjust an output voltage of said power converter;

a trim pin electrically connected to said error-amplifier circuit; and a slew-rate circuit electrically connected to said error-amplifier circuit, said slew-rate circuit adapted to receive a slew-rate signal from said controller, said error-amplifier circuit adjusting the slew rate of said output voltage in accordance with said slew-rate signal.

11. The system of claim 10, wherein said slew-rate circuit further comprises a transistor electrically connected to said error-amplifier circuit via said trim pin.

12. The system of claim 10, wherein said power converter further comprises a control pin electrically connected to said error-amplifier circuit via said slew-rate circuit.

13. The system of claim 12, wherein said slew-rate circuit further comprises an operational amplifier.

14. The system of claim 12, wherein said slew-rate circuit is further adapted to receive a voltage from said controller via said control pin.

15. The system of claim 13, wherein said slew-rate circuit is further adapted to receive a current from said controller via said control pin.

16. The system of claim 12, wherein said slew-rate circuit is further adapted to receive a charge from said controller via said control pin.

17. The system of claim 12, wherein said slew-rate circuit further comprises a digital potentiometer.

18. A system for controlling output voltage slew rate in a power converter, comprising:

a controller;

a power converter electrically connected to said controller, said power converter comprising:

a trim pin adapted to receive a trim signal;

a control pin electrically connected to said controller and adapted to receive a slew-rate signal; and an error-amplifier circuit comprising an operational amplifier and electrically connected to said trim pin said error-amplifier circuit adapted to adjust an output voltage of said power converter over a first operational range in response to said reference voltage and adjust said output voltage of said power converter over a second operational range larger than said first operational range in response to said slew-rate signal.

* * * * *